United States Patent
Morrison (10) Patent No.: US 7,516,753 B2
(45) Date of Patent: Apr. 14, 2009

(54) TOILET TANK PLUMBING FIXTURE ASSEMBLY

(76) Inventor: Robert P. Morrison, 20080 Myron Dr., Livonia, MI (US) 48152

( * ) Notice: Subject to any disclaimer, the term of this patent is extended or adjusted under 35 U.S.C. 154(b) by 0 days.

(21) Appl. No.: 11/933,140

(22) Filed: Oct. 31, 2007

(65) Prior Publication Data

US 2008/0104749 A1    May 8, 2008

Related U.S. Application Data

(63) Continuation-in-part of application No. 11/080,049, filed on Mar. 15, 2005, now Pat. No. 7,293,577.

(51) Int. Cl.
*F16K 31/18* (2006.01)
(52) U.S. Cl. ...................................... 137/409
(58) Field of Classification Search ................. 137/409, 137/426; 251/148, 151; 285/402
See application file for complete search history.

(56) References Cited

U.S. PATENT DOCUMENTS

| | | |
|---|---|---|
| 1,329,141 A | 1/1920 | Rice |
| 2,738,801 A | 3/1956 | Reaves |
| 2,814,306 A | 11/1957 | Ponsar |
| 3,130,586 A | 4/1964 | Taylor et al. |
| 3,797,518 A | 3/1974 | Holm et al. |
| 3,996,960 A | 12/1976 | Martinez-Lozano |
| 4,100,928 A | 7/1978 | Schoepe |
| 4,180,096 A | 12/1979 | Johnson |
| 4,182,364 A | 1/1980 | Gilbert et al. |
| 4,240,606 A | 12/1980 | Shames et al. |
| 4,340,082 A | 7/1982 | Straus |
| 4,562,859 A | 1/1986 | Johnson |
| 4,765,363 A | 8/1988 | Pi-Yu |
| 5,125,578 A | 6/1992 | Ballu |
| 5,188,399 A | 2/1993 | Durina |
| 5,326,036 A | 7/1994 | Wilger |
| 5,366,262 A | 11/1994 | Couvreur |
| 5,409,168 A | 4/1995 | Nelson et al. |
| 5,445,183 A | 8/1995 | Mitson |
| 5,598,865 A | 2/1997 | Musso |
| 5,842,498 A | 12/1998 | Locke et al. |
| 5,950,666 A | 9/1999 | Ray et al. |
| 6,102,067 A | 8/2000 | Orlando |
| 7,293,577 B2 * | 11/2007 | Morrison ..................... 137/409 |
| 2004/0112718 A1 | 6/2004 | Brixius et al. |
| 2006/0207661 A1 | 9/2006 | Morrison |

* cited by examiner

*Primary Examiner*—John Rivell
*Assistant Examiner*—Craig M Schneider
(74) *Attorney, Agent, or Firm*—Reising Ethington PC (57) ABSTRACT

A plumbing fixture assembly for a toilet tank comprising an upper portion that connects with a valve, a lower portion adapted for engagement with the upper portion, and an attachment pipe that that connects at a first end with lower portion and at a distal end with a supply line.

18 Claims, 4 Drawing Sheets

TOILET TANK PLUMBING FIXTURE ASSEMBLY

FIELD OF THE INVENTION

The present invention is directed towards a plumbing fixture for a toilet tank and more particularly toward plumbing fixture assemblies that provide a removable connection between a supply line and a valve.

BACKGROUND OF THE INVENTION

Traditional water closet tanks, such as toilet tanks found in residential and commercial settings, have a float valve connected to a water supply line. It sometimes becomes necessary to assemble or disassemble these parts for cleaning, replacing, and the like. Doing so usually requires turning off the water supply, emptying the tank, and disconnecting the water supply line. These tasks, among others, can make the assembly or disassembly process unduly burdensome.

U.S. Pat. No. 6,102,067 shows a bifurcated fill valve assembly generally having a fill valve retaining nut and a tank fitting. This assembly permits removal of a fill valve with a flange without disconnecting a water supply line.

U.S. Pat. No. 5,842,498 shows a mounting adapter for mounting a diaphragm fill valve to a water delivery line such that the fill valve is mountable and dismountable without separating the mounting adaptor from the water delivery line. This adapter mounts a fill valve with opposing valve base compression cams on its base.

The objects, advantages, and features of the present invention are directed to providing a plumbing fixture assembly that is simple in design and construction to give a removable connection between a supply line and a valve where the assembly can fit most commercially available valves.

BRIEF SUMMARY OF THE INVENTION

Described is a plumbing fixture assembly for a toilet tank comprising an upper portion that connects with a valve, a lower portion that is adapted for engagement with the upper portion, and an attachment pipe that connects at a first end with the lower portion and at a distal end with a supply line.

The present invention is also concerned with a plumbing fixture assembly that provides a removably connected fluid flow path between a supply line and a valve in a toilet tank comprising an upper portion having a base with a hub and at least one extension extending away from the base, and a lower portion having a base with a hub and at least one extension extending away from the base, wherein, when assembled, the upper and lower portion extensions are matingly engaged to form the fluid flow path and to provide a seal between the upper and lower portions.

The present invention is further concerned with a method of installing a plumbing fixture assembly between a supply line and a valve in a toilet tank, comprising providing the plumbing fixture with an upper portion, a lower portion, and an attachment pipe. The method further comprises connecting the upper portion with the valve, engaging the lower portion with the upper portion, and connecting the attachment pipe at a first end with the lower portion and at a distal end with the supply line, wherein the installed plumbing fixture provides a sealed fluid flow path from the supply line to the valve.

BRIEF DESCRIPTION OF THE SEVERAL VIEWS OF THE DRAWINGS

These and other objects, features and advantages of this invention will be apparent from the following detailed description, appended claims and accompanied drawings in which:

DETAILED DESCRIPTION OF THE INVENTION

In general, two illustrative embodiments are shown to describe a plumbing fixture assembly designed to give a removable connection between a supply line and a valve in a toilet tank. The fixture is adapted for fit with most commercially available valves, and also for fit with a water supply line. These features make the fixture suitable for both residential and commercial toilet tanks. And so it is described as used particularly with a float valve that is opened by external means and closed in response to a float, and with a conventional water supply line. But its nature and design make its use more encompassing. For example, it is contemplated for use with valves that are opened and closed by any means, and supply lines that simply supply fluids. Consequently, its use is not limited to toilet tanks.

Figure 1:
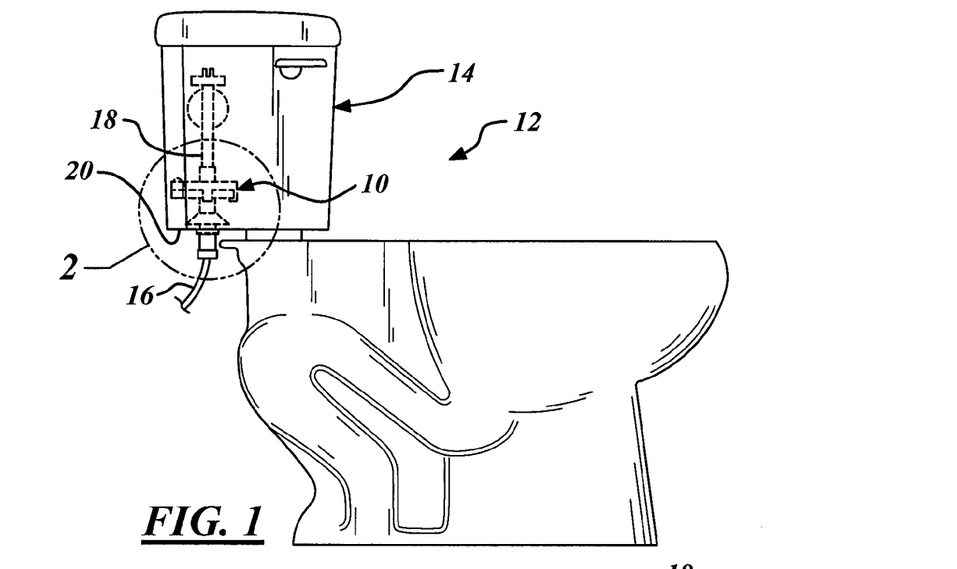
FIG. 1 is a schematic representation of a plumbing fixture assembly of the present invention shown installed in a toilet tank.

One embodiment of a plumbing fixture assembly 10 is shown in FIGS. 1, 2, 3, and 4. Particularly, FIG. 1 shows a fixture 10 as used in a toilet 12 and specifically as installed in a toilet tank 14. In toilet tank 14, fixture 10 is placed between a supply line 16, specifically a water supply line, and a valve 18, specifically a float valve. As in FIG. 2, and as is common in toilet tanks, toilet tank wall 20 has an opening 22 to connect supply line 16 to valve 18. Installed this way, fixture 10 provides a removably connected sealed fluid flow path between supply line 16 and valve 18. In this sense, the fixture is a semi-permanent intermediate connection between the supply line and the valve that eliminates the need to disconnect the supply line when removing the valve.

Figure 2:
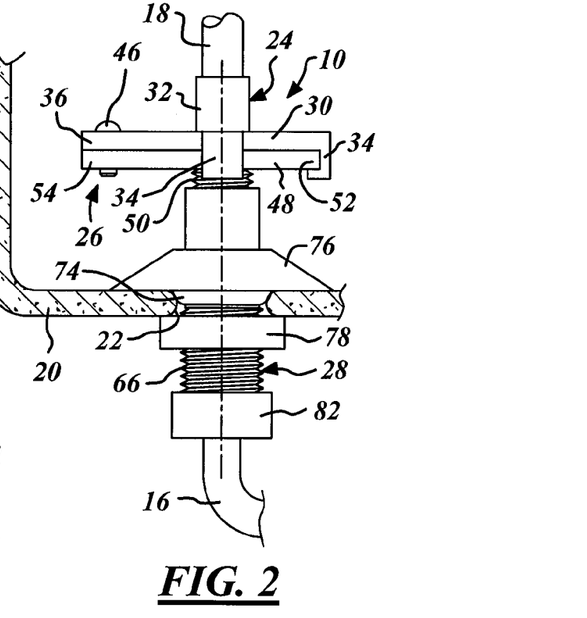
FIG. 2 is a side close-up view of the plumbing fixture of FIG. 1.

As noted, when installed the plumbing fixture is adapted to provide a removable connection between the valve and the supply line while allowing fluid flow so that the valve can function properly. When fixture 10 is assembled and installed as shown in FIG. 2, it generally resembles an elongated pipe from the supply line to the valve. This elongated pipe is made up of separate components comprising an upper portion 24, a lower portion 26, and an attachment pipe 28. All of the components may be manufactured from an injection molding process with any conventional plastic material that is suitable for fluid flow such as thermoplastic, such as, polyethylene, polypropylene, polybetylene, nylon and the like, a thermoset, such as, polyurethane, polyester, and the like. It is to be appreciated that system compatible metals may also be used, such as copper or bronze. These components are installed near the bottom of a toilet tank, in the order shown, one on top of the other.

Figure 4:
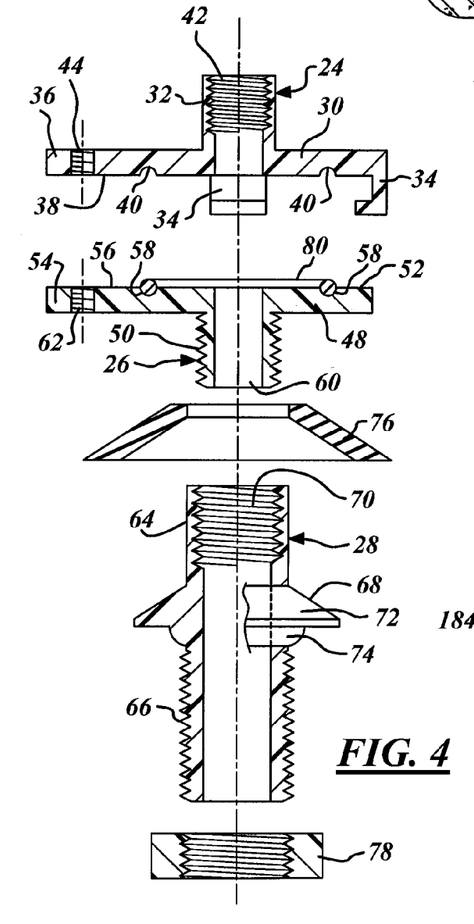
FIG. 4 is an exploded sectional view of the plumbing fixture of FIG. 1 taken along line 4-4 in FIG. 3.

Looking at FIGS. 2 and 4, the uppermost component of fixture 10 is upper portion 24. Portion 24 is adapted to connect with valve 18 at one end, engage lower portion 26 at its other end, and allow fluid flow therebetween. As noted, the upper portion may be manufactured through an injection molding process using conventional plastic to form an integral structure. As can be seen in FIG. 2, portion 24 is located inside toilet tank 14 between valve 18 and portion 26. Looking at both Figures, portion 24 includes a base 30, a hub 32, extensions 34, and a thumbscrew extension 36. Base 30 acts as an interface between portions 24 and 26. It generally has a circular shape with planar front and rear faces. FIG. 4 shows a front face 38 that faces portion 26 while the opposite rear face faces valve 18. Face 38 has a continuous circular groove 40 cut therein sized to fit an o-ring when the assembly is installed. The groove is generally centered with respect to the front face.

Hub 32 extends away from the rear face, opposite the front face. The hub physically connects to and seals with the valve when the assembly is put together. For this connection, hub 32 is a cylindrically shaped barrel that is internally threaded. The threads line the inner surface of the barrel and mesh with complementary outer threads located on the connecting end of the valve. The diameter of hub 32 is slightly larger than the diameter of the connecting end of valve 18 to provide a fluid tight seal between the two. The hub has a bore 42 extending through the center of the hub and continuously with a uniform diameter through front face 38. The bore provides a fluid path through the upper portion.

Figure 3:
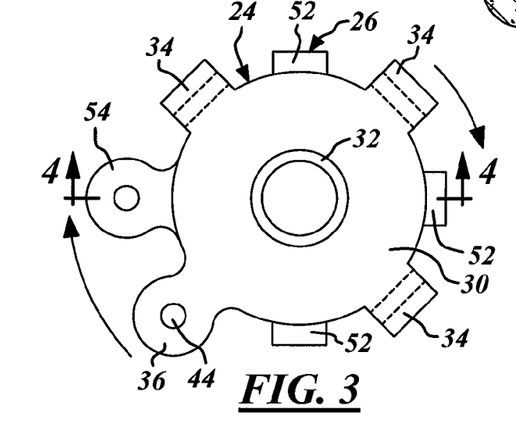
FIG. 3 is a top view of the plumbing fixture of FIG. 1 as it would be assembled and installed.

Looking now at FIGS. 3 and 4, extensions 34 lie around the base periphery. These extensions are adapted to engage and capture complementary shaped lower portion extensions. They are generally c-shaped and formed into base 30. In one direction they extend radially away from the base periphery and in another perpendicular direction they extend axially away from that periphery. As shown best in FIG. 4, they then finally extend radially back toward base 30, thus completing their c-shape. Looking at FIG. 3, there are three extensions 34 spaced apart and around the base periphery. As noted, for every upper portion extension there is an opposite lower portion extension. Thumbscrew extension 36 is also formed into base 30, and extends in a similar radial way. Likewise, this extension has a complementary lower portion extension so that when the plumbing fixture is assembled, the two extensions will give an additional connection for the upper and lower portions and further ensure proper sealing between those portions. Extension 36 resembles an oval extending away from the base periphery. The oval has a center thru-hole 44 to fit a thumbscrew 46 (shown in FIG. 2). All of the extensions may be equally spaced around the periphery.

Looking again at FIGS. 2 and 4, lower portion 26 is the middle component of fixture 10. Portion 26 is adapted to engage upper portion 24 at one end, connect to attachment pipe 28 at its other end, and allow fluid flow therebetween. In some ways the lower portion resembles a mirror image of the upper portion with a few exceptions. The lower portion can also be manufactured through an injection molding process using conventional plastic or metal to form the integral structure using plastics or metals discussed above. When assembled and installed, portion 26 is located inside toilet tank 14 lying below portion 24 and above pipe 28. As with portion 24, portion 26 includes a base 48, a hub 50, extensions 52, and a thumbscrew extension 54. Base 48 interfaces with upper portion base 30. It generally has a circular shape with planar front and rear faces. A front face 56 faces toward portion 24 while the opposite rear face is facing toward pipe 28. Similar to its counterpart, face 56 has a continuous circular groove 58 cut therein. And groove 58 is sized and located similar to groove 40. This means that when the upper and lower portions are engaged, a single o-ring can fit between the two grooves.

A variation on the mirror image resemblance is hub 50. This hub physically connects to the attachment pipe to form a fluid tight seal between the lower portion and the pipe when they are put together. Hub 50 is a cylindrically shaped barrel with external threads. The threads line the outer surface of the barrel to mesh with complementary inner threads on a connecting end of the attachment pipe. The diameter of hub 50 is slightly smaller than the diameter of the connecting end to provide the above mentioned fluid tight seal. The hub further forms a bore 60 extending through the center of the hub and continuously with a uniform diameter through front face 56. This bore provides a fluid path through the lower portion.

FIGS. 3 and 4 show another variation on the mirror image resemblance. Extensions 52 lie along the lower portion base periphery. As noted above, these extensions are adapted to be engaged and captured by the upper portion extensions when the fixture is assembled and installed. Accordingly, they are shaped and located to complement their c-shaped counterparts. Extensions 52 are formed into base 48 and extend radially away from the base periphery, they do not, however, extend as far as extensions 34. This is so they can be captured in a snug fit manner. As with the upper portion, there may be three extensions 52 spaced around the base periphery. As noted, thumbscrew extension 54 is a counterpart to extension 36 and, as so, has a complementary shape and location. When the upper and lower portions are engaged, these extensions give an additional connection and seal. Extension 54 also has a center thru-hole 62 in its oval shape to catch an end of thumbscrew 46. All of the extensions on the lower portion may likewise be equally spaced around the base periphery.

Looking at FIGS. 2 and 4, attachment pipe 28 is the lowermost component of fixture 10. Pipe 28 is adapted to connect with lower portion 26 at a first end, connect supply line 16 at a distal end, and provide fluid flow therebetween. The attachment pipe is generally shaped like a cylindrical pipe with a flange about midway. The attachment pipe is manufactured through an injection molding process using conventional plastic or metal as discussed above to form an integral structure. Looking at FIG. 2, when pipe 28 is installed in toilet tank 14, the first end located above the flange is inside the tank while the distal end located below the flange protrudes through toilet tank wall opening 22 and is thus located outside the tank. Inside the tank the attachment pipe connects to the lower portion, and outside the tank the pipe connects to the supply line.

Looking now at both FIGS. 2 and 4, pipe 28 includes a first end 64, a distal end 66, a flange 68, and a bore 70. First end 64 physically connects to lower portion hub 50 and forms a fluid tight seal when these components are put together. For this connection and seal, the first end is internally threaded. The threads line the inner surface of the first end starting at its far end facing lower portion 26, and continuing until about flange 68. The threads mesh with complementary outer threads on lower portion hub 50. Distal end 66 is located opposite first end 64 on the other side of flange 68. The distal end physically connects to supply line 16 and forms a fluid tight seal when these components are put together. The end is externally threaded with threads lining its outer surface starting at its far end and continuing until about flange 68. The threads and the distal end diameter complement a lock nut and a coupler as will described later.

Looking at FIG. 4, flange 68 is located about midway on pipe 28 between ends 64 and 66. The flange mounts and seals the attachment pipe on the toilet tank wall through the wall opening. The flange is formed into the outer surface of the attachment pipe so as to resemble a peripheral bulge on the pipe. Flange 68 includes a flared portion 72 and a washer portion 74. Shown in FIG. 2, flared portion 72 sits on the toilet tank wall and around the wall opening when the pipe is installed. Its outer surface is shaped similar to a gasket so that the gasket can lie flush over it. Washer portion 74 is formed from the bottom of flared portion 72 and sits partially within the wall opening when the attachment pipe is installed. This portion has a slight curve about its periphery and is dimensioned slightly smaller than the wall opening so that it snugly fits therein. In FIG. 4, pipe 28 also has a bore 70 extending completely and uniformly through its center. The bore provides a fluid path from the supply line to the lower portion. It extends from distal end 66 to first end 64.

FIGS. 2 and 4 show other separate components of fixture 10 that include a gasket 76 and a lock nut 78. Gasket 76 provides a fluid tight seal between opening 22 and flange 68. The rubber gaskets are conventional for plumbing assemblies and thus will be known to those skilled in the art. It is shaped similar to flared portion 72 and dimensioned to be slightly larger to form a flush fit when placed over that portion. Conventional lock nut 78 locks pipe 28 in opening 22 as best shown in FIG. 2. It is both shaped and threaded complementary to the pipe distal end so it can fit over that portion.

When assembled and installed, fixture 10 provides a substantially uninterrupted axial fluid flow path from the supply line to the valve. The fluid, water, will see very minimal, if any, dimensional changes as it flows through the generally uniform path. As shown in FIGS. 2 and 4, the fixture will be described as assembled and installed in the bottom-to-top arrangement shown, that is from supply line 16, to attachment pipe 28, to lower portion 26, to upper portion 24, and then to valve 18. The particular order of assembly is not important. Pipe 28 is placed through wall opening 22 until flange 68 sits in the opening as previously described. Lock nut 78 is threaded over distal end 66 to lock and secure the pipe in the tank. Outside the tank, supply line 16 is coupled to the protruding end 66 with a coupler 82. The coupler provides a fluid tight seal between the two.

Inside the tank, gasket 76 is slid down first end 64 and placed over flared portion 72 to form a fluid seal between the gasket and tank wall 20. Lower portion 26 can now be connected to pipe 28. Its hub 50 is threaded into first end 64 tight enough to be secured and sealed. An o-ring 80 can be placed in groove 58 for sealing. Looking at FIG. 3, upper portion 24 is placed onto the lower portion such that the upper portion extensions and the lower portion extension are misaligned. This is so front faces 38 and 56 can be engaged generally flush. The upper portion is then hand-turned, with a slight downward force, in a clockwise direction. As the extensions approach each other, extensions 52 are fit into the c-shaped extensions 34 so that they are matingly engaged and captured as shown best in FIG. 2. Once captured, a fluid tight seal is formed between the upper and lower portions, and specifically between bores 42 and 60. O-ring 80 provides an additional seal. Thumbscrew 46 can now be inserted and screwed into thumbscrew extensions 36 and 54. Finally, valve 18 can be connected to hub 32 by threading and thus sealing the components together.

When the plumbing fixture assembly is assembled and installed, it provides a somewhat simple task in removing the valve. Only the upper and lower portions need be disengaged. This is done by unscrewing the thumbscrew and hand-turning the upper portion in a counter-clockwise direction. The upper portion, with the valve, can then be removed from the tank. This means the rest of the assembly—lower portion, attachment pipe, etc.—can remain in place.

Figure 5:
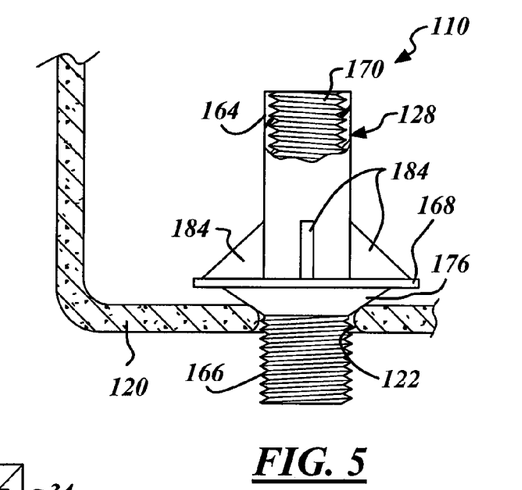
FIG. 5 is a side view of another embodiment of the plumbing fixture of the present invention, one part shown partially cut-away to reveal internal threads.
Figure 6:
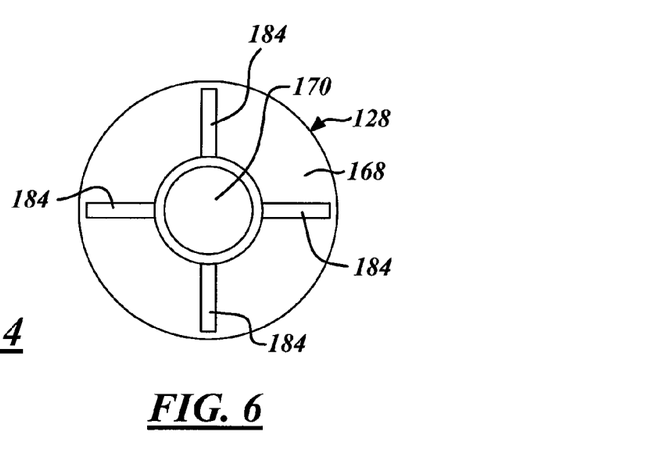
FIG. 6 is a top view of a part of the embodiment shown in FIG. 5.

Another embodiment of a plumbing fixture assembly 110 is shown in FIGS. 5 and 6. As will be apparent, only an attachment pipe 128 is shown. This embodiment varies from the first embodiment. Other components not shown, including the upper portion, lower portion, and lock nut, are still part of this assembly and can thus perform equivalently to that described in the previous embodiment. Moreover, the structures and functions for pipe 128 perform equivalently to that previously described. Generally, only differences will be described.

FIGS. 5 and 6 show attachment pipe 128 including a first end 164, a distal end 166, a flange 168, and a bore 170. First end 164 includes fins 184. These fins provide structural support for the pipe, but moreover provide a structure that can be easily grasped for assembling and installing the pipe. The fins are generally shaped like a triangle and they may be injection molded as an integral part of pipe 128. As best shown in FIG. 6, there are four fins 184 equally spaced about the periphery of first end 164. They extend from that periphery to flange 168 in the radial direction, and from about midway up end 164 down to flange 168 in the axial direction. Flange 168 mounts and seals attachment pipe 128 on a tank wall 120 through a wall opening 122. The flange is injection molded integrally into the attachment pipe outer surface so as to resemble a peripheral bulge on the pipe. The flange includes a flared portion that is not shown in either Figure. This portion is similar to that described in the previous embodiment except it is flipped upside down. It sits in wall opening 122 when the pipe is installed by way of its slanted outer surface. The outer surface is shaped similar to a gasket 176 so that the gasket can lie flush over it as shown. Gasket 176 provides a fluid tight seal between opening 122 and flange 168. It is a conventional rubber gasket as will be known to those skilled in the art. The gasket is dimensioned slightly larger than the flange flared portion for when it is placed over it during installation.

This embodiment is assembled and installed in a similar way as the previous embodiment to provide a substantially uninterrupted axial fluid flow path from the supply line to the valve. Differences in this attachment pipe structure otherwise do not change the assembly and installation procedure or its general function.

Figure 7:
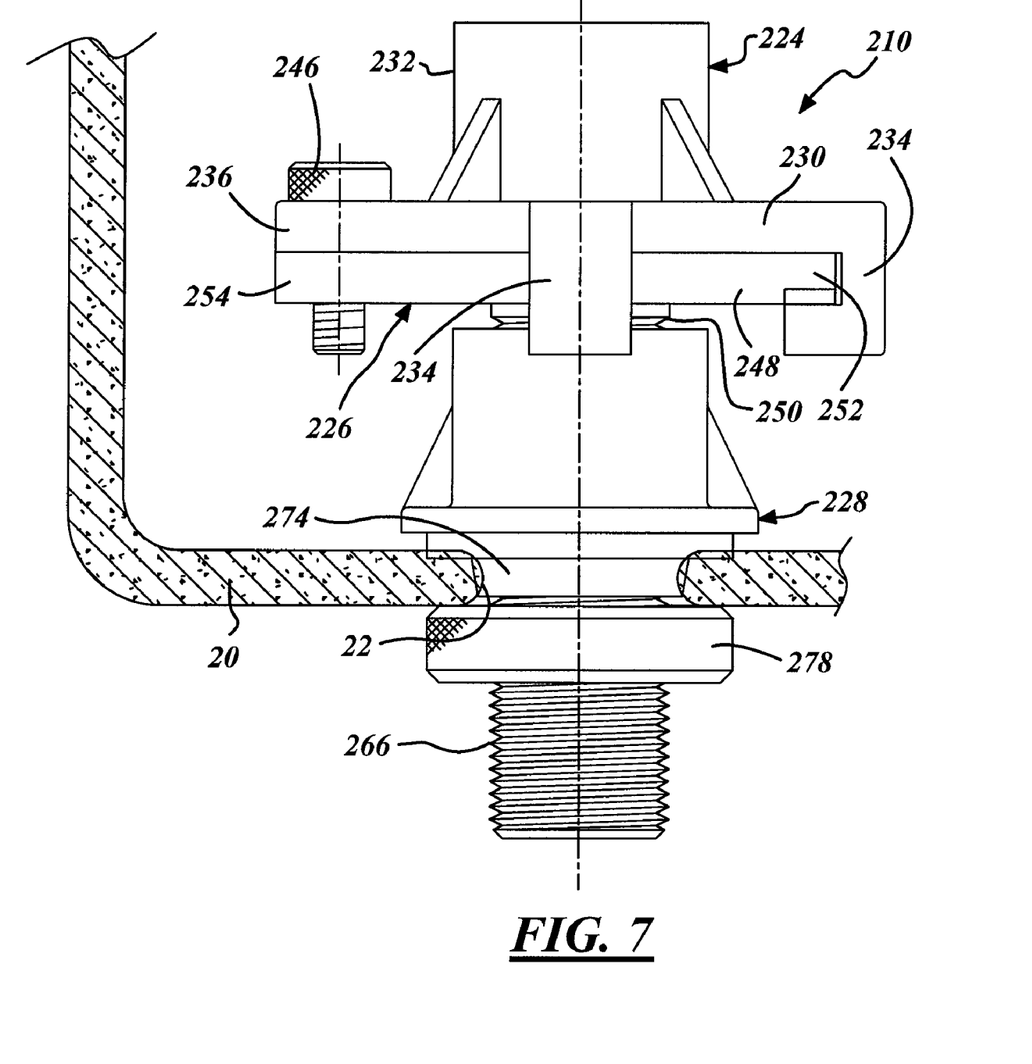
FIG. 7 is a side view of another embodiment of the plumbing fixture of the present invention installed in a toilet tank, which is partially shown in cross section.
Figure 8:
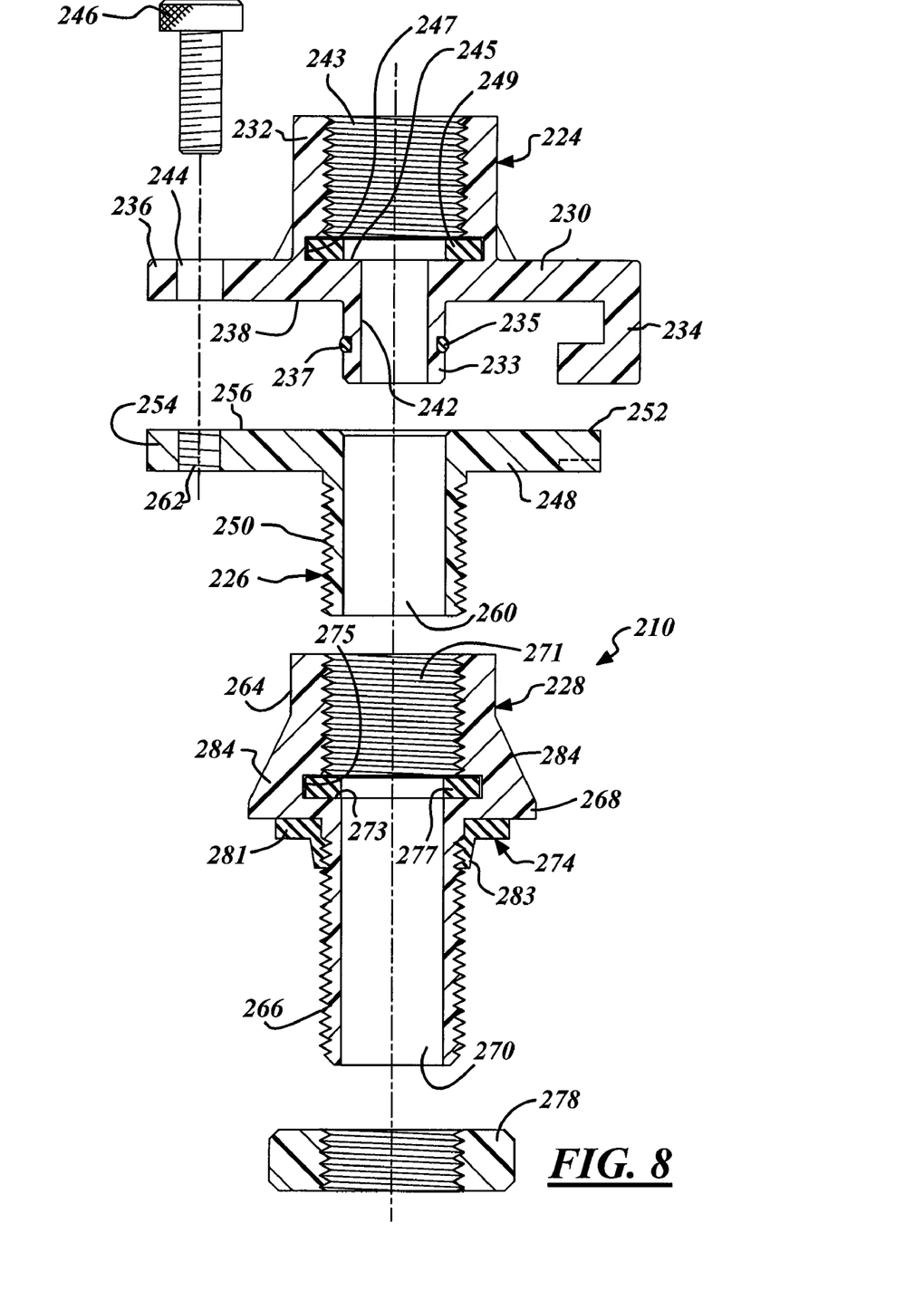
FIG. 8 is an exploded cross-sectional view of the plumbing fixture of FIG. 7.

FIGS. 7 and 8 illustrate another presently preferred embodiment of a plumbing fixture assembly. This embodiment is similar in many respects to the embodiments of FIGS. 1 through 6 and like numerals between the embodiments generally designate like or corresponding elements throughout the several views of the drawing figures. Additionally, the descriptions of the embodiments are incorporated by reference into one another and the common subject matter may generally not be repeated here.

The assembly 210 includes an upper portion 224, a lower portion 226, and an attachment pipe 228 adapted to be mounted on the tank wall 20 through the wall opening 22 using a nut 278. As will be described in detail below, the assembly 210 may provide additional sealing capability beyond that provided by the previously described embodiments. More specifically, the assembly 210 may provide for radial sealing between the upper and lower portions 224, 226 instead of or in addition to the axial sealing provided by the above described embodiments, and may also provide internal axial sealing as will be described in detail herein below.

Referring generally to FIGS. 7 and 8, the upper portion includes a base 230, a rear hub 232 that may be internally threaded and extends from a rear face of the base 230, and a front hub 233 extending from a front face 238 of the base 230. The front hub 233 may include an annular groove 235 to carry a seal 237, which may be of any suitable shape and size and may be composed of any suitable material such as a thermoplastic or elastomeric material. The upper portion 224 includes extensions 234 extending from the base 230, and a thumbscrew extension 236 extending from the base 230 and carrying a hole 244 to accept a fastener such as a thumbscrew 246. The upper portion 224 includes a bore 242 that may extend through the base 230 and the front hub 233, a counterbore 243 that may be threaded and may extend into the rear hub 232, and an internal shoulder 245 disposed therebetween. An internal annular groove 247 may be provided in the upper portion 224 adjacent the internal shoulder 245, and may accept a sealing washer 249 at least partially therein. The sealing washer 249 may be of any suitable shape and size and may be composed of any suitable material such as a thermoplastic or elastomeric material. Accordingly, when a valve or a conduit (not shown) is threaded into the counterbore 243, an axial end portion of the valve or conduit may axially seal against the sealing washer 249.

The lower portion 226 includes a base 248, a rear hub 250 that may be externally threaded and extends from the base 248, and a bore 260 to receive and cooperate with the front hub 233 of the upper portion 224 to radially seal the assembly 210. The lower portion 226 also includes extensions 252 that fit in and cooperate with the extensions 234 of the upper portion 224 upon relative rotation therebetween to connect the assembly 210. The lower portion 226 also includes a thumbscrew extension 254 that includes a hole 262 that may be aligned with the hole 244 of the upper thumbscrew extension 236. The lower portion 226 also includes a front face 256 adapted to mount against the front face 238 of the upper portion 224. The faces 238, 256 may include grooves and/or seals (not shown) therebetween to additionally seal the assembly 210.

The attachment pipe 228 includes a first end 264 that may be internally threaded, a distal end 266 that may be externally threaded, a flange 268 therebetween, and a bore 270 therethrough. The flange 268 may include one or more fins 284. A washer 274 may be disposed adjacent the flange 268, may be of suitable shape and size, and may be composed of any suitable material such as a thermoplastic or elastomeric material. The washer 274 may include a planar portion 281 and a tapered pilot portion 283. The attachment pipe 228 may also include a counterbore 271 that may be threaded, and an internal shoulder 273 between the counterbore 271 and the bore 270. An internal annular groove 275 may be provided in the attachment pipe 228 adjacent the internal shoulder 273, and may accept a sealing washer 277 at least partially therein. The sealing washer 277 may be of any suitable shape and size and may be composed of any suitable material such as a thermoplastic or elastomeric material. Accordingly, when the threaded rear hub 250 of the lower portion 226 is threaded into the threaded counterbore 271 of the attachment pipe 228, an axial end portion of the hub 250 may seal axially against the sealing washer 277.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention. For example, the several plumbing fixture components can take on many shapes and sizes so long as a fluid flow path is provided between the supply line and the valve.

The invention claimed is:

1. A plumbing fixture assembly for installation in a toilet tank at an opening of a wall of the toilet tank to provide a removable connection between a portion of a float valve and a water supply line, the assembly comprising:
   an attachment pipe connectable to the toilet tank at the opening of the wall of the toilet tank when the plumbing fixture assembly is installed in the toilet tank, and including an internally threaded first end, an externally threaded distal end, a flange therebetween constructed and arranged to mount and seal the attachment pipe to the toilet tank wall through the wall opening, and a bore extending therethrough and constructed and arranged to provide a fluid path from the water supply line;
   a lower portion including a first base having generally circular shape and planar first front and rear faces, an externally threaded hub extending from the first rear face for engagement with the internally threaded first end of the attachment pipe when the lower portion is connected to the attachment pipe, and first extensions extending radially away from the periphery of the first base;
   an upper portion including a second base having generally circular shape and planar second front and rear faces, an internally threaded hub extending from the second rear face and constructed and arranged to engage the float valve portion when the plumbing fixture assembly is installed in the toilet tank, and second extensions extending radially away from the periphery of the second base, wherein the first and second extensions are complementarily shaped to be matingly engageable with one another when the upper portion is turned relative to the lower portion to connect the lower and upper portions; and
   a hub carrying a seal and extending from the second front face of the upper portion into a bore of the lower portion.

2. The assembly of claim 1, further comprising a seal disposed between the first and second front faces of the lower and upper portions.

3. The plumbing fixture assembly of claim 1 wherein the front face of the upper portion has a groove therein for an o-ring.

4. The plumbing fixture assembly of claim 3 wherein the front face of the lower portion has a groove therein for an o-ring.

5. The plumbing fixture assembly of claim 4 wherein, when assembled, the upper and lower portion respective front faces are engaged generally flush with each other, and providing an o-ring in the grooves for sealing.

6. The plumbing fixture assembly of claim 1 wherein the attachment pipe has at least one fin extending away from the attachment pipe periphery.

7. The plumbing fixture assembly of claim 1 wherein, when assembled, a thumbscrew further seals the upper and lower portions.

8. A method of installing a plumbing fixture assembly in a toilet tank at an opening of a wall of the toilet tank and providing a removable connection between a portion of a float valve and a water supply line, between a supply line and a valve in a toilet tank comprising:

providing the plumbing fixture assembly with an upper portion, a lower portion, and an attachment pipe wherein the attachment pipe is connectable to the toilet tank at the opening of the wall of the toilet tank when the plumbing fixture assembly is installed in the toilet tank, and includes an internally threaded first end, an externally threaded distal end, a flange therebetween constructed and arranged to mount and seal the attachment pipe to the toilet tank wall through the wall opening, and a bore extending therethrough and constructed and arranged to provide a fluid path from the water supply line;

the lower portion includes a first base having generally circular shape and planar first front and rear faces, an externally threaded hub extending from the first rear face for engagement with the internally threaded first end of the attachment pipe when the lower portion is connected to the attachment pipe, and first extensions extending radially away from the periphery of the first base; and the upper portion includes a second base having generally circular shape and planar second front and rear faces, an internally threaded hub extending from the second rear face and constructed and arranged to engage the portion of the float valve when the plumbing fixture assembly is installed in the toilet tank, a hub carrying a seal and extending from the second front face into a bore of the lower portion, and second extensions extending radially away from the periphery of the second base, wherein the first and second extensions are complementarily shaped to be matingly engageable with one another when the upper portion is turned relative to the lower portion to connect the lower and upper portions;

connecting the upper portion with the float valve portion;
engaging the lower portion with the upper portion; and
connecting the attachment pipe at a first end with the lower portion and at a distal end with the supply line;
wherein the installed plumbing fixture assembly provides a sealed fluid flow path from the supply line to the float valve and eliminates the need to disconnect the supply line when removing the float valve.

9. A plumbing fixture assembly for installation in a toilet tank at an opening of a wall of the toilet tank to provide a removable connection between a portion of a float valve and a water supply line, the assembly comprising:

an attachment pipe connectable to the toilet tank at the opening of the wall of the toilet tank when the plumbing fixture assembly is installed in the toilet tank, and including an internally threaded first end, an externally threaded distal end, a flange therebetween constructed and arranged to mount the attachment pipe to the toilet tank wall through the wall opening, and a bore extending therethrough and constructed and arranged to provide a fluid path from the water supply line;

a lower portion including a first base having generally circular shape and planar first front and rear faces, an externally threaded hub extending from the first rear face for engagement with the internally threaded first end of the attachment pipe when the lower portion is connected to the attachment pipe, and first extensions extending radially away from the periphery of the first base;

an upper portion including a second base having generally circular shape and planar second front and rear faces, an internally threaded hub extending from the second rear face and constructed and arranged to engage the float valve portion when the plumbing fixture assembly is installed in the toilet tank, and second extensions extending radially away from the periphery of the second base, wherein the first and second extensions are complementarily shaped to be matingly engageable with one another when the upper portion is turned relative to the lower portion to connect the lower and upper portions; and a hub extending from the second front face of the upper portion into a bore of the lower portion.

10. The plumbing fixture assembly of claim 9 wherein the upper portion includes the hub extending from the second front face into the bore of the lower portion.

11. The plumbing fixture assembly of claim 9 wherein the hub is an integral portion of the upper portion.

12. The plumbing fixture assembly of claim 9 wherein the hub includes an annular groove carrying a seal to radially seal the assembly.

13. The plumbing fixture assembly of claim 12 wherein a seal is also disposed between the first and second front faces of the lower and upper portions to axially seal the assembly.

14. The plumbing fixture assembly of claim 13 wherein the front face of the upper portion has a groove therein for an o-ring, and the front face of the lower portion has a groove therein for an o-ring.

15. The plumbing fixture assembly of claim 9 wherein the upper portion includes a bore, a counterbore, and a washer disposed at an internal shoulder therebetween.

16. The plumbing fixture assembly of claim 15 wherein the upper portion includes an internal annular groove adjacent the internal shoulder and the washer is at least partially disposed in the internal annular groove.

17. A plumbing fixture assembly for installation in a toilet tank at an opening of a wall of the toilet tank to provide a removable connection between a portion of a float valve and a water supply line, the assembly comprising:

an attachment pipe connectable to the toilet tank at the opening of the wall of the toilet tank when the plumbing fixture assembly is installed in the toilet tank, and including an externally threaded end, a flange spaced from the threaded end and being constructed and arranged to mount the attachment pipe to the toilet tank wall through the wall opening, and a bore extending therethrough and constructed and arranged to provide a fluid path from the water supply line;

a lower portion extending from the attachment pipe and including a first base having generally circular shape and a planar first front face, a bore providing a fluid path from the water supply line, and first extensions extending radially away from the periphery of the first base; and an upper portion including a second base having generally circular shape and a planar second front face and a rear face, a hub extending from the second front face into the bore of the lower portion and carrying a radial seal to provide a fluid-tight seal between the upper and lower portions, a second bore extending through the hub, an internally threaded hub extending from the rear face and including a counterbore in fluid communication with the second bore and constructed and arranged to engage the float valve portion when the plumbing fixture assembly is installed in the toilet tank, an internal shoulder disposed between the second bore and the counterbore, an axial seal disposed against the internal shoulder to provide a fluid-tight seal with the float valve portion, and second extensions extending radially away from the periphery of the second base, wherein the first and second extensions are complimentarily shaped to be matingly engageable with one another when the upper portion is turned relative to the lower portion to connect the lower and upper portions.

18. The plumbing fixture assembly of claim 17, wherein the attachment pipe is separate from the lower portion and further includes an internally threaded end opposite the externally threaded end, and the lower portion further includes an externally threaded hub for threaded connection with the internally threaded end of the attachment pipe.

* * * * *